US012484546B2

(12) United States Patent
Wiesenfeld

(10) Patent No.: US 12,484,546 B2
(45) Date of Patent: Dec. 2, 2025

(54) CAT LITTER BOX DISPLAYING A FLUORESCENT CAT ATTRACTANT

(71) Applicant: Boxiecat LLC, Santa Monica, CA (US)

(72) Inventor: Josh Wiesenfeld, Santa Monica, CA (US)

(73) Assignee: Boxiecat LLC, Santa Monica, CA (US)

( * ) Notice: Subject to any disclaimer, the term of this patent is extended or adjusted under 35 U.S.C. 154(b) by 0 days.

(21) Appl. No.: 18/605,187

(22) Filed: Mar. 14, 2024

(65) Prior Publication Data
US 2024/0306594 A1    Sep. 19, 2024

Related U.S. Application Data

(60) Provisional application No. 63/452,132, filed on Mar. 14, 2023.

(51) Int. Cl.
*A01K 1/01* (2006.01)

(52) U.S. Cl.
CPC .................. *A01K 1/0107* (2013.01)

(58) Field of Classification Search
CPC .................................... A01K 1/0107
See application file for complete search history.

(56) References Cited

U.S. PATENT DOCUMENTS

2005/0028745 A1 * 2/2005 Baillie ................. A01K 1/0107
                                                            119/165
2019/0191669 A1 * 6/2019 Heatley ............... A01K 23/005

FOREIGN PATENT DOCUMENTS

| CN | 110326539 | A | * | 10/2019 | |
| CN | 113598069 | A | * | 11/2021 | |
| CN | 114375856 | A | * | 4/2022 | |
| KR | 20130001408 | U | * | 3/2013 | |
| WO | WO-2012168529 | A1 | * | 12/2012 | ............. A01K 1/011 |

* cited by examiner

*Primary Examiner* — Joshua D Huson
*Assistant Examiner* — Alanna K Peterson
(74) *Attorney, Agent, or Firm* — Linda L. Lewis

(57) ABSTRACT

An attractive cat litter box comprising a cat litter box that displays at least one fluorescent compound; wherein the at least one fluorescent compound fluorescent compound fluoresces in the absence of urine, feces, blood, and other bodily fluids; wherein the at least one fluorescent compound is detectable on the cat litter box when the cat litter box is exposed to ultraviolet light; and wherein the at least one fluorescent compound attracts cats to eliminate in the cat litter box.

18 Claims, No Drawings

CAT LITTER BOX DISPLAYING A FLUORESCENT CAT ATTRACTANT

CROSS-REFERENCE TO RELATED APPLICATIONS

This application claims the benefit of provisional patent application No. 63/452,132 filed Mar. 14, 2023, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present disclosure relates generally to cat litter boxes that display fluorescent compounds to attract cats to the litter box.

Related Art

Litter boxes are used by cats for elimination of urine and fecal matter. A litter box contains a layer of cat litter that receives the urine and fecal matter. The cat litter is granular and absorbent to facilitate formation of clumps after the urine and fecal matter is deposited in the cat litter. The clumps are typically sifted from the litter box using a litter scoop and then discarded.

House soiling, also known as inappropriate elimination or out-of-box elimination ("OOB"), is a significant behavioral issue for pet owners. The soiling of the house can become intolerable for the pet owner and undermine the human-pet bond. Frequently, the situation results in the relinquishment of the cat to a shelter. Shelters know that finding homes for cats with OOB issues is difficult, and such cats are often euthanized. In this regard, OOB elimination behaviors actually lead to the death of more cats than any other behavioral issue and many feline diseases.

Cats stop using their litter boxes for a variety of reasons, including a medical condition, anxiety or territorial aggression in multiple-cat homes. Owners are encouraged to place the litter box in a quiet place in the home, and to give the cat a litter box without a lid that has enough room for it to turn around comfortably. The litter itself can be a problem, and may need to be changed. It is recommended to use unscented, clumping cat litter that can be scooped and fill the box only 2 to 3 inches deep. It is also recommended to clean the litter at least once a day with a litter scoop, and add more litter boxes. Owners note minimal success employing these treatments.

Attractants are added to litter and used to attract cats to the litter for elimination purposes. These include pheromones, black currant oil, black seed oil, catnip, cat grass, chamomile, lavender, licorice, Matatabi, methalactone, 3-Mercapto-3-methylbutan-1-ol, musk oil, peppermint oil, pine oil, rosemary, vanillin, and white truffle oil. However, these attractants have limited success. Accordingly, there remains a need for an attractant to attract cats to the litter for elimination purposes.

Patent application WO2016/170475 relates to the use of L-Felinine, a cat pheromone precursor, to attract a cat to eliminate in a litter, which is hereby incorporated by reference. U.S. Patent publication US2021/0087161 discloses methods and uses of a composition comprising 2,2-dimethyl-1,3-dioxolane-4-methanol in pet litters, in particular for promoting in-litter elimination by pets, which is hereby incorporated by reference.

It has been reported that cats have the ability to see blues and ultraviolet (UV) light. They do not perceive red colors. Since many fluorescent compounds emit blue and UV light, it is likely that cats are attracted to fluorescent compounds. These compounds, when used on an attractive cat litter box could be used to attract the cat to the litter box.

SUMMARY OF THE INVENTION

The present invention is an attractive cat litter box which comprises a cat litter box displaying at least one fluorescent compound, wherein the at least one fluorescent compound is detectable on the cat litter box by glowing when the cat litter box is exposed to ultraviolet light; and wherein the at least one fluorescent compound attracts cats to eliminate in the litter box. The cat litter box has a bottom and sides that define an open water-tight container.

In another embodiment, the cat litter box includes a lid that engages with and over the litter box, wherein the lid displays the at least one fluorescent compound, wherein the at least one fluorescent compound is detectable on the cat litter box by glowing when the cat litter box is exposed to ultraviolet light.

In another embodiment, the cat litter box includes an insert placed on or inside the litter box, wherein the insert displays the at least one fluorescent compound, wherein the at least one fluorescent compound is detectable on the cat litter box by glowing when the cat litter box is exposed to ultraviolet light. Preferably, the insert is planar and water resistant. Preferably the dimensions are from 1 inch by 1 inch to 10 by 10 inches. More preferably, the dimensions are from 2 inch by 2 inch to 6 inches by 6 inches. In an embodiment, the cat litter box has a cover, and the insert is placed on the cover. In another embodiment, the cat litter box has a front entrance, and the insert is placed outside the box at the entrance. In another embodiment, the insert is placed inside the litter box at the back to lure the cat into the litter box.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The attractive cat litter box comprises a cat litter box displaying at least one fluorescent compound. The cat litter box can be of any well-known shape or size. The litter box has a bottom and sides that define an open water-tight container. In a preferred embodiment, the litter box has a bottom and four sides. Optionally, the box has a lid, either as a separate, removeable part, or as an integral part of the entire box. One portion of the sides can be lower, to provide a front entrance to the box. For a box with four sides, one of the sides can be lower. One or more rear sides can be higher, to catch the cat's elimination.

Displayed on the cat litter box is at least one fluorescent compound. The fluorescent compound must not be harmful to cats or the environment. Fluorescent whitening agents, called optical brighteners, are fluorescent materials that can absorb UV light and emit visible (blue-violet). When exposed to white light, they can also emit some UV light. Preferably, they are hydrophilic water-soluble compounds, and are mainly anionic diamino stilbene (DAS) or distyryl biphenyl (DSBP) derivatives displaying a low aquatic toxicity. The most common classes of compounds with this property are the stilbenes, e.g., 4,4'-diamino-2,2'-stilbene-disulfonic acid. The compounds 4,4'-bis(benzoxazolyl)-cis-stilbene and 2,2'-(2,5-thiophenediyl)-bis(5-tert-butylbenzoxazole) are also intensely fluorescent and used as optical brighteners. A commercially available dry optical brightener powder is KEYFLUOR™ WHITE OB sold by Millikin. The fluorescent compound present in the optical brightener is 2,2'-(2,5-thiophenediyl)-bis (5-tert-butylbenzoxazole), cas #7128-64-5 and is not water soluble. A water soluble optical brightener is Pylaklor White S-15A, Pylaklor White S-15A is made by Pylam Dyes, and contains 4-(2H-Naphtho[1,2-d]triazol-2-yl)-2-stilbenesulfonic acid sodium salt.

Typically the coating and/or the plastic contains from about 0.01 to about 10.0 wt. % fluorescent material. More preferably, the amount of fluorescent material is from about 0.05 to 5.0 wt. % on the coating or the plastic. The amount of fluorescent material needed must be sufficient that, when ultra violet light is shown on the litter box, the fluorescent material visibly glows.

The at least one fluorescent compounds of the present invention are not limited to optical brighteners. However, it is well know that cat urine is a fluorescent material, and cat urine is not included in the fluorescent compounds of the present invention. Additionally, the compounds contemplated in this invention are fluoresce in the absence of urine, blood, feces or other bodily fluids that are known to activate fluorescence in compounds such as luminol.

In a preferred embodiment, the fluorescent compound is applied to the box as a coating, or a partial coating applied in a decorative manner. Fluorescent paints can be applied to the litter box. In a preferred embodiment, the fluorescent compound is blended with a translucent or transparent paint and applied to the surface of the litter box. In another embodiment, the fluorescent compound is applied as an applique, or as an adhesive-backed laminate.

In another embodiment, the fluorescent compound is blended into a polymer before the polymer is molded into a litter box. In a preferred embodiment, the polymer is a translucent or a transparent polymer. Preferably, the fluorescent compounds are applied at the entrance to the litter box to attract the cat. However, anywhere the cat can observe the fluorescence is suitable.

In another preferred embodiment, the cat litter box is made of injection molded plastic, and the fluorescent compound is embedded in the plastic of the cat litter box, wherein the at least one fluorescent compound visibly glows when ultraviolet light is shown on the cat litter box.

In a preferred embodiment, the fluorescent compounds are applied to the interior of the cat litter box to attract the cat to enter the box. In another embodiment, the cat litter box is made of a clear plastic to allow the fluorescent compound to attract the cat from any angle or position. In another preferred embodiment, wherein the cat litter box has a cover, and the fluorescent compounds are scattered across the top inside of the box for a star-like appearance.

EXAMPLES

A So Phresh™ High-Back Open Cat Litter Box sold by Petco is used. This litter box has a lower front height for easy entry and exit while the raised back wall guards the area around their pan from scatter and spray from the cat using the cat litter. The shape of the box is approximately rectangular with a flat bottom and sides that tape outward. The dimensions of the litter box are length 24 inches, back and side height 10 inches, width 18 inches, and front height 6.25 inches.

Example 1

The So Phresh™ litter box is painted with fluorescent paint containing a transparent base and contained a 5% UV fluorescent compound. The fluorescent compound is a dry optical brightener powder is KEYFLUOR™ WHITE OB sold by Millikin. The fluorescent compound present in the optical brightener is 2,2'-(2,5-thiophenediyl)-bis (5-tert-butylbenzoxazole), cas #7128-64-5 and is not water soluble. When ultra violet light is shown on the litter box, it visibly glows a blue-white color.

Example 2

The So Phresh™ litter box is painted with fluorescent paint containing a transparent base and contained a 5% UV fluorescent compound. The fluorescent compound is a water soluble optical brightener is Pylaklor White S-15A, Pylaklor White S-15A is made by Pylam Dyes, and contains 4-(2H-Naphtho[1,2-d]triazol-2-yl)-2-stilbenesulfonic acid sodium salt. When ultra violet light is shown on the litter box, it visibly glows a blue-white color.

Example 3

Fluorescent adhesive tape is applied to the exterior of the So Phresh™ litter box. ViVVID DECO65 glow in the dark permanent adhesive craft vinyl tape is used. When ultra violet light is shown on the litter box, it visibly glows a blue color.

Example 4

A cat litter box is made by injection molding a transparent plastic containing at least one fluorescent compound. The box is approximately rectangular with a flat bottom and sides that tape outward. The dimensions of the litter box are length 24 inches, back and side height 10 inches, width 18 inches, and front height 6.25 inches. The transparent plastic contains 5 wt. % of a UV fluorescent compound. The fluorescent compound is a dry optical brightener powder is KEYFLUOR™ WHITE OB sold by Millikin. The fluorescent compound present in the optical brightener is 2,2'-(2,5-thiophenediyl)-bis (5-tert-butylbenzoxazole), cas #7128-64-5 and is not water soluble. When ultra violet light is shown on the litter box, it visibly glows.

Example 5

A IRIS USA Hooded Litter Box with Front Door Flap, Enclosed Kitty Litter Tray is used. The hooded litter box has a removeable top which engages with the litter tray to form the hooded litter box. The dimensions of the hooded litter box are 19 inches long by 15 inches wide by 15.5 inches high. The removeable top is painted is painted with fluorescent paint containing a transparent base and contained a 5% UV fluorescent compound. The fluorescent compound is a dry optical brightener powder is KEYFLUOR™ WHITE OB sold by Millikin. The fluorescent compound present in the optical brightener is 2,2'-(2,5-thiophenediyl)-bis (5-tert-butylbenzoxazole), cas #7128-64-5 and is not water soluble. When ultra violet light is shown on the hooded litter box, it visibly glows a blue-white color.

Example 6

A ultra violet printed planar plastic insert of dimensions 4 inches by 6 inches was inserted into the back of the So Phresh™ litter box, so that the flat surface is displayed. When ultra violet light is shown on the litter box, the insert visibly glows a blue-white color.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An attractive cat litter box comprising a cat litter box and at least one fluorescent compound,
    wherein the cat litter box has a bottom and sides that define an open at the top, water tight at the bottom container;
    wherein the at least one fluorescent compound does not contain cat urine;
    wherein the at least one fluorescent compound fluoresces in the absence of urine, feces, blood, and other bodily fluids;
    wherein the at least one fluorescent compound visibly glows when the litter box is exposed to ultraviolet light;
    wherein the at least one fluorescent compound fluoresces in the UV, violet and blue spectra; and
    wherein the at least one fluorescent compound attracts cats to eliminate in the cat litter box.

2. The attractive cat litter box of claim 1,
    wherein the at least one fluorescent compound comprises 2,2'-(2,5-thiophenediyl)-bis (5-tert-butylbenzoxazole).

3. The attractive cat litter box of claim 1,
    wherein the cat litter box is made of plastic; and
    wherein the at least one fluorescent compound is applied as a coating, applique, adhesive-backed laminate, embedded in the plastic of the cat litter box, or embedded on the surface of the plastic cat litter box.

4. The attractive cat litter box of claim 3, wherein the plastic is translucent or transparent and the at least one fluorescent compound is embedded in the plastic of the cat litter box.

5. The attractive cat litter box of claim 4, wherein the coating is a translucent or transparent coating containing at least one fluorescent compound.

6. The attractive cat litter box of claim 3,
    wherein the litter box has a front entrance portion with a lower wall for the cat to enter; and
    wherein the fluorescent compound is applied at the front entrance portion to attract the cat.

7. The cat litter box of claim 1, further comprising an insert,
    wherein the at least one fluorescent compound is applied to the cat litter box by an insert displaying the at one fluorescent compound; and
    wherein the insert is water resistant.

8. The attractive cat litter box of claim 7,
    wherein the insert is planar and the dimensions are from 1 inch by 1 inch to 10 inches by 10 inches.

9. The attractive cat litter box of claim 7, wherein the insert is plastic and displays the at least one fluorescent compound.

10. The attractive cat litter box of claim 7, wherein the insert is displayed on the exterior of the cat litter box.

11. The attractive cat litter box of claim 7, wherein the insert is displayed at the front entrance portion of the cat litter box to attract the cat.

12. The attractive cat litter box of claim 7, wherein the cat litter box has a cover, and the insert is displayed on the cover.

13. The attractive cat litter box of claim 7, wherein the cat litter box has a cover, and the insert is displayed inside the cover of the cat litter box.

14. A hooded attractive cat litter box comprising a cat litter box, a cat litter box cover, and at least one fluorescent compound,
    wherein the cat litter box has a bottom and sides that define an open, water tight container;
    wherein the cat litter box cover engages with the cat litter box to form the hooded attractive cat litter box;
    wherein the at least one fluorescent compound fluoresces in the UV, violet and blue spectra;
    wherein the at least one fluorescent compound does not contain cat urine;
    wherein the at least one fluorescent compound fluoresces in the absence of urine, feces, blood, and other bodily fluids;
    wherein the at least one fluorescent compound visibly glows when the cat litter box is exposed to ultraviolet light; and
    wherein the at least one fluorescent compound attracts cats to eliminate in the cat litter box.

15. The hooded attractive cat litter box of claim 14,
    wherein the cat litter box is made of plastic; and
    wherein the at least one fluorescent compound is applied as a coating, applique, adhesive-backed laminate, embedded in the plastic of the cat litter box, or embedded on the surface of the plastic cat litter box.

16. The hooded attractive cat litter box of claim 15, where the at least one fluorescent compound is applied to the cat litter box cover.

17. The hooded attractive cat litter box of claim 15, wherein the at least one fluorescent compound is applied to the cat litter box.

18. The hooded attractive cat litter box of claim 15,
    wherein the fluorescent compound is applied to both the cat litter box and the cat litter box cover.

* * * * *